United States Patent

Catherin

[15] 3,642,373
[45] Feb. 15, 1972

[54] RING-SHAPED LASER WITH MEANS FOR CANCELLING THE FIZEAU EFFECT

[72] Inventor: Jean-Michel Catherin, Savigny-sur-Orge, France

[73] Assignee: Compagnie Generale D'Electricite, Paris, France

[22] Filed: May 11, 1970

[21] Appl. No.: 36,327

[30] Foreign Application Priority Data

May 9, 1969 France..................................6915091

[52] U.S. Cl.......................................356/106 LR, 331/94.5
[51] Int. Cl.........................................G01b 9/02, H01g 3/00
[58] Field of Search..........................356/106 LR; 331/94.5

[56] References Cited

UNITED STATES PATENTS

| | | | |
|---|---|---|---|
| 3,469,922 | 9/1969 | Coccoli et al. | 356/106 |
| 3,390,606 | 7/1968 | Podgorski | 356/106 |
| 3,411,849 | 11/1968 | Aronowitz | 356/106 |
| 3,471,804 | 10/1969 | Bridges et al. | 356/106 |

Primary Examiner—Ronald L. Wibert
Assistant Examiner—V. P. McGraw
Attorney—Sughrue, Rothwell, Mion, Zinn & Macpeak

[57] ABSTRACT

A device for cancelling the Fizeau effect in a ring-shaped laser. A mixing device mixes the two progressive waves of said ring-shaped laser, a detecting device coupled to the output of said mixing device detects the beat frequency of the two progressive waves and a control device coupled between the output of detecting device and the current inputs of the ring-shaped laser and responsive to the beat frequency causes the input current to the ring-shaped laser to create an effect therein equal to, in magnitude, and opposite to, in direction, to the Fizeau effect.

8 Claims, 3 Drawing Figures

RING-SHAPED LASER WITH MEANS FOR CANCELLING THE FIZEAU EFFECT

BACKGROUND OF THE INVENTION

This invention relates to ring-shaped lasers and more particularly to devices which cancel out the Fizeau effect that entails fluctuations in the zero of a ring-shaped laser.

We know that there develop, in a ring-shaped laser, in the polygonal cavity, two waves circulating in the opposite directions which should have the same frequency when the rate-gyro is motionless and different frequencies when, for example, the rate-gyro is rotating. When the rate-gyro moves at slow angular speed, corresponding to a beat frequency between the two waves which is less than a few hundred cps, there develops a blind zone, a well-known phenomenon in laser rate-gyros.

In certain applications of ring-shaped lasers, especially in the field of angle measurement, it is necessary to obtain a zero in the apparatus which corresponds to a zero value of the beat frequency of the two ring-shaped laser waves, or in other words, the ring-shaped laser must not be the seat of any artificial anisotropy.

Let us recall first of all that a continuous electric current, traversing a gas contained in a tube with a small inside diameter, creates, along the inside walls of the tube, a gas flow going from the anode to the cathode, in the form of a crown of gas supported on the inside wall of the tube, this phenomenon being known as the Langmuir effect.

The movement of the gas thus created engenders an overpressure in the region of the cathode. This overpressure is then balanced by a flow of neutral atoms returning to the anode, passing through the center of the tube. The discharge tube of a ring-shaped laser is the seat of such a phenomenon when it is excited with continuous current.

When the laser beam traverses the discharge tube along its longitudinal axis, it encounters a fluid in motion along its axis of propagation. Thus two waves traversing the tube in the opposite directions can have a different optical trajectory (Fizeau effect), corresponding to indexes of different media traversed, hence different frequencies, since the length of the cavity for the two waves does not seem equal.

The frequency of each progressive wave emitted by the laser depends on the total optical length of the trajectory which it runs through inside the cavity. We know moreover that a constant optical trajectory difference engenders a constant frequency difference.

In certain applications, one must produce ring-shaped lasers with zero frequency difference, i.e., perfectly stable anisotropy.

To cancel out the Fizeau effect created in a ring-shaped laser discharge tube, several devices and methods have already been worked out. We know that a ring-shaped laser consists very schematically of a discharge tube, arranged on one of the sides of a polygonal cavity formed by reflecting mirrors.

To cancel out the Fizeau effect and to get a zero anisotropy, use was made of a laser discharge tube supplied with high frequency, thus causing each electrode successively to play the role of anode and of cathode. If the frequency is sufficiently high, the plasma cannot follow the alternate variations of the current. But, in fact, the mean value of the current is never zero and we just the same even observe slow fluctuations in the plasma, which brings about a frequency modulation in the beat frequency, when for instance, the laser is subjected to a rotation.

Use has also been made of two geometrically symmetrical discharge tubes, supplied with continuous current, making it possible to obtain two essentially equal discharges going, however, in opposite directions; this was done to obtain two symmetrical Fizeau effects which make it possible to obtain a zero anisotropy of the ring-shaped laser.

In fact, however, discharge tubes are never perfectly geometrically symmetrical, moreover, the values of the electrical currents, which pass into the two parts of the tube, are never perfectly equal and can even fluctuate in the course of time in an entirely haphazard fashion; as a result, the Fizeau effect inside the discharge tube is noted just the same and we do not get a zero and perfectly stable anisotropy.

Attempts have also been made to improve the construction of discharge tubes by making a single tube and by giving it a geometrically symmetrical shape, involving a central cathode and two anodes contained in bulbs arranged at each end of the tube, symmetrically with respect to the central cathode. This tube—being equivalent to the two tubes described above—entails the same inconveniences.

The purpose of this invention is to reduce these inconveniences by improving upon the last construction.

SUMMARY OF THE INVENTION

This invention relates to a ring-shaped laser with zero anisotropy, involving at least one discharge tube permitting us to obtain two opposing electrical discharges, arranged on one of the sides of a polygonal cavity, a device for mixing the two progressive waves of the ring-shaped laser, at whose output we place a beat detector for the two waves, characterized particularly by the fact that it involves a modulator permitting us to modulate—in terms of amplitude, at low frequency—the total continuous electrical current $I_T$ feeding the two electrical discharges connected to a controllable device permitting us to obtain, at two symmetrical outputs, two electrical currents $I_1$ and $I_2$ is whose sum is equal to $I_T$ but whose difference $I_1-I_2$ can be controlled through a servo chain by the low-frequency signal detected at the output of a discriminator connected to the output of said beat detector, the two symmetrical outputs of the controllable device being connected to the inputs of the discharge tube.

The ring-shaped laser according to this invention offers the advantage of having a constantly zero anisotropy which can be continuously servo controlled.

Other features and advantages of this invention will appear in the following specification, referring to the drawing attached by way of illustration but by no means restrictive, where:

DETAILED DESCRIPTION OF THE INVENTION

By applying the Langmuir and Fizeau effects mentioned above, the invention proposes to produce a ring-shaped laser with zero and perfectly stable anisotropy.

Figure 1:
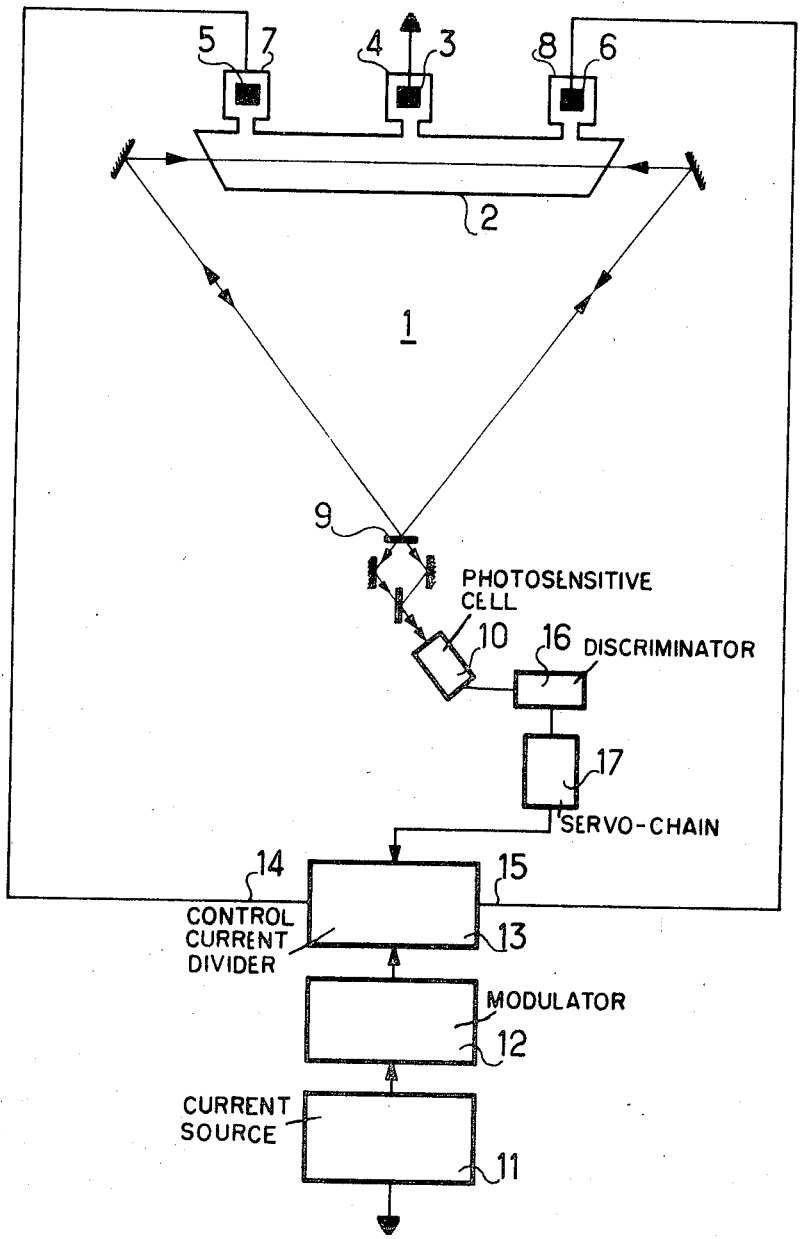
FIG. 1 shows the basic diagram of the ring-shaped laser according to the invention.

FIG. 1 shows a ring-shaped laser with zero anisotropy according to the invention.

The ring-shaped laser 1 involves a geometrically symmetrical discharge tube 2 permitting us to obtain two essentially symmetrical discharges. By way of example for making a discharge tube, permitting us to obtain two symmetrical discharges, we show a discharge tube, consisting of a cylindrical enclosure, containing the active gaseous medium, involving a cathode 3 and a bulb 4 placed in the center of the enclosure and two anodes 5 and 6 placed in two bulbs 7 and 8, arranged at the ends of the enclosure, symmetrically with respect to bulb 4.

The discharge tube 2 is placed on one of the sides of the polygonal, generally triangular optical cavity defined by a series of mirrors at least one of which is semitransparent, such as mirror 9. A series of reflecting and semireflecting mirrors enables us to mix and to cause to beat on a photosensitive cell 10, the two progressive waves of the ring-shaped laser emerging from the semitransparent mirror 9.

The output of continuous current source 11 delivers an electrical current $I_T$ and is connected to the input of a modulator 12 permitting us to obtain an amplitude modulation of current $I_t$.

The output of amplifier 12 is connected to the input of a controllable device 13 enabling us to obtain, at two symmetrical outputs 14 and 15, two electrical currents $I_1$ and $I_2$ so that the sum $I_1+I_2$ will be equal to $I_T$ modulated but so that, as a function of the signal imposed upon device 13, the difference $I_1$ and $I_2$ will be variable. Device 13 is controlled by means of a discriminator 16 connected to the output of detector 10 and a servo chain 17.

The outputs 14 and 15 of device 13 are connected, respectively, in the case in the figure, to anodes 5 and 6 of discharge tube 2. The current can be returned by grounding, for example, the midpoint of the tube, that is, cathode 3 and the second output of source 11.

The amplitude modulation of current $I_T$ can, by way of example, be about 10 percent of its average amplitude and the modulation frequency, without having a critical value, is so selected that this will be a very low frequency, for instance, between 2 and 10 c.p.s.

The device works as follows:

The amplitude modulation of the sum current $I_T$ will be transferred at the same percentage on each of the currents $I_1$ and $I_2$. The modulation of currents $I_1$ and $I_2$ will entail a modulation in the progression speeds of the gaseous flows and it will consequently bring about—due to the Fizeau effect—a frequency drop for the two progressive waves of the ring-shaped laser.

When the two progression speeds of the two gaseous flows inside the tube are equal, the frequencies of the two progressive waves of the ring-shaped laser will have the same value, since the two waves will then in that case run along the same optical path.

On the other hand, when the ring-shaped laser is moreover subjected, for example, to a rotation, and when the lengths of the optical paths, seen by the two waves inside the cavity, vary slightly, the detector 10 will detect a low-frequency modulated beat frequency.

The low frequency is more particularly due to the fluctuations in the propagation speeds of the gaseous flows insides the discharge tube, i.e., the Langmuire effect and the higher beat frequency is due to the rotation of the ring-shaped laser. These fluctuations in the propagation speed of the gaseous flow are caused especially by the variations in the temperature and the electrical current.

According to the invention, we give current $I_T$ a value sufficient so that the currents, which pass in each discharge, will be sufficient to create a large gaseous flow in each part of the tube since we amplitude modulate the two currents $I_1$ and $I_2$ at low frequency so that the flow rates of the gaseous fluxes can follow this modulation; the detector then detects a low frequency modulated beat frequency.

The modulation frequency of the total beat frequency due to the modulation of the total current $I_T$ is selected from the total beat frequency, when for example, the ring-shaped laser is rotating, by the discriminator 16 whose input is connected to the output of detector 10. The total beat frequency is always a much greater frequency than the modulation frequency, since we select a modulation frequency on the order of several cycles per second, for instance, 3 or 4 c.p.s.

The signal obtained at the output of discriminator 16 is then treated by servo chain 17 and permits us to control the control device 13 which enables us to vary the difference $I_1-I_2$. We thus get two propagation speeds for the gaseous flow inside the tube which are constantly equal.

We can thus control and maintain the zero of the ring-shaped laser, that is to say, a laser with zero and perfectly stable anisotropy. To perform the control of the zero of the ring-shaped laser correctly, the progression of the gaseous fluxes inside the tube 2 must be the most faithful possible image of the modulation of currents $I_1$ and $I_2$ which feed the electrical discharges created between anodes 5 and 6 and cathode 3.

Generally, the enclosure containing the active medium is made up of a capillary tube with a very small volume and to keep a relatively constant gas volume inside the tube, we associate with it large volume tubes serving both as enclosures for the electrodes and as gas reserves.

To make sure that the ring-shaped laser according to the invention will work properly, the bulbs must no longer play the role of a buffer volume.

According to another feature of the invention, we make very small-volume bulbs with which we associate gas tanks connected to these bulbs by capillary conduits with heavy charge loss.

Figure 2:
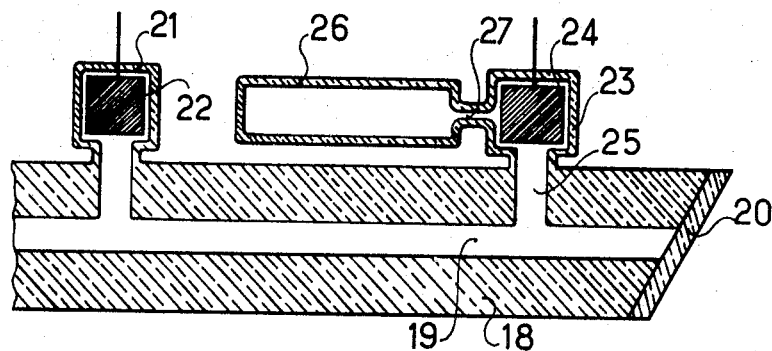
FIG. 2 shows a partial section view of one way of making the discharge tube of a ring-shaped laser according to the invention.

In FIG. 2, we showed a portion of the discharge tube according to this latter feature:

The discharge tube consists of a cylindrical tube 18, involving an axial drill hole 19, forming the capillary. This capillary is closed at its ends by transparent plates inclined at the Brewster angle, as for example thin plate 20.

In its center, tube 18 furthermore has a small volume bulb 21, enclosing cathode 22, and at each of these ends, a bulb such as bulb 23, which has a very small volume and which is almost entirely occupied by anode 24. This bulb is connected, on the one hand, to capillary 19 by channel 25 having a diameter equivalent to that of the capillary 19 and, on the other hand, to a gas tank 26 by a capillary 27 having a very small diameter and forming a large charge loss. This capillary 27 has the job of creating a pneumatic filter equivalent to a band-pass filter in electricity and to prevent the damping of the modulated flow rate of the gaseous flow in the center of capillary 19.

We know furthermore that the frequency of an advancing wave in a ring-shaped laser is proportional to the product of gain G of a laser and of the voltage V applied to the discharge terminals $f=k\,G\,V$.

Moreover, V is equal to $P\cdot EI$, E here being the value of the electrical field and I being the value of the current passing in the discharge, P being the coefficient of proportionality. Considering E constant in a first approximation, V takes on the value $M\cdot I$ (M here being a proportionality coefficient).

When, according to the invention, we amplitude-modulate the current I, the value of current I is equal to $I_0+\Delta_I\cos\omega t$ or: $I_0(1+m\cos\omega t)$ (m being the amplitude modulation percentage).

The respective frequencies of the two progressive waves of the ring-shaped laser then have the value:

$$f_1=KG_1M_1I_{10}[1+m\cos\omega t]$$

and $$f_2=KG_2M_2I_{20}[1+m\cos\omega t]$$

The beat frequency obtained at the output of the beat detector $10\Delta_f=f_1-f_2$ is thus equal to:

$\Delta_f=f_1-f_2=K[G_1M_1I_{10}-G_2M_2I_{20}]+$
$m\cos\omega t[G_1M_1I_{10}-G_2M_2I_{20}]$ We thus see that—since the gain is a function of the current passing in the discharge—it offers the advantage in that its value remains approximately constant so as not to superimpose a parasite modulation on the beat frequency.

We know that the curve of the gain of a laser as a function of the current passing in the electrical discharge is a curve presenting a maximum and that the gain, on either side of the this maximum, can be considered constant.

According to another feature of the invention, we advantageously regulate the midpoint of the operation of the laser at the maximum of the value of the gain.

Figure 3:
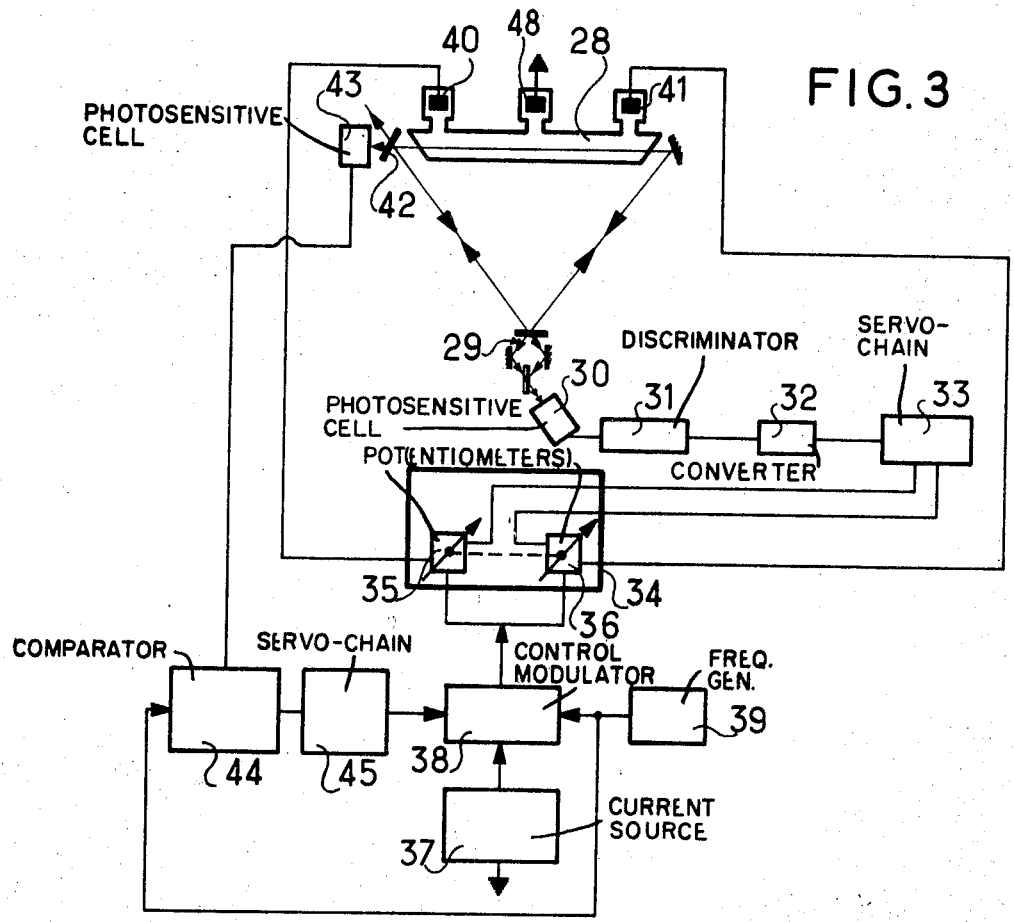
FIG. 3 shows the basic diagram of a practical way of using the ring-shaped laser according to the invention.

FIG. 3 shows a practical example of making a ring-shaped laser according to the invention.

The ring-shaped laser involves a discharge tube 28, as described earlier, a mixer 29 which mixes the two progressive waves of the laser, at whose output is placed a photosensitive cell 30, a discriminator 31 which detects the signal delivered by cell 30. The output of the discriminator is connected to the input of a converter 32 which delivers a voltage proportional to the low frequency detected by the discriminator 31. This voltage is then applied to an electronic servo chain 33, connected to a controllable current divider 34, equivalent to two coupled electronic potentiometers 35 and 36.

The current source 37 delivers a current $I_T$ which is amplitude modulated by a controllable device 38 guided by a frequency generator 39. The output of controllable device 38 is connected to the input of divider 34 whose two symmetrical outputs are, respectively, connected to the anodes 40 and 41 of the discharge tube 28, the cathode 48 being grounded.

In order approximately to maintain the gain of the laser at its maximum value, we arrange, as shown in FIG. 3, a semitransparent mirror 42 on one of the summits of the polygonal cavity of the ring-shaped laser, then on the path of one of the beams emerging from mirror 42 we place a photosensitive cell 43 which delivers a signal proportional to the power of this beam.

The output of cell 43 is connected to an electronic device 44 permitting us to compare, with the frequency delivered by generator 39, the two extreme values of the energy of the light beam when the current $I_T$ is amplitude modulated. The output of comparator 44 is then connected to an input of the controllable device 38 by a servo chain 45, keeping the mean value of current $I_T$ at the value which corresponds to the maximum value of the gain of the ring-shaped laser.

Of course, the invention is not limited to the manner of implementation described and shown, which was given here only by way of example. In particular, we can, without going beyond the framework of the invention, introduce detail modifications, change certain arrangements, or replace certain means by equivalent means.

What is claimed is:

1. A device for cancelling the Fizeau effect in a ring-shaped laser discharge tube containing a gaseous medium comprising:
   a. a discharge tube including a first and second means for generating first and second opposing electrical discharges in the gaseous medium,
   b. means for applying electrical currents to said first and second generating means,
   c. means for modulating at low frequency said currents to cause modulation of said electrical discharges,
   d. mixer means, responsive to the two progressive waves generated by said ring-shaped laser,
   e. detecting means coupled to the output of said mixer means for detecting the beat frequency of said two progressive waves,
   f. a discriminator, the input of which is coupled to the output of said detecting means for recovering a low-frequency component of the detected beat frequency, and
   g. a control device coupled between said discriminator and said electric-current-applying means and responsive to said recovered low-frequency component of the beat frequency for causing the current supplied to said first and second generating means to create an effect therein equal to, in magnitude, and opposite to, in direction, the two progressive waves of the Fizeau effect.

2. A device as claimed in claim 1, wherein said first and second generating means comprises two anodes, and at least one cathode, each anode including separate current receiving means, said control device includes a servo chain and means, responsive to the servo chain, for varying the currents applied to the current receiving means of said two anodes, the sum of the two currents remaining constant.

3. A device as claimed in claim 2 wherein said ring-shaped laser comprises a discharge tube, a single cathode arranged at the longitudinal center of said discharge tube and said two anodes arranged at the opposite ends of said discharge tube, said anodes being essentially symmetrical with respect to said cathode, and bulbs in gaseous communication with said discharge tube enclosing said cathode and said anodes with the inside dimensions of said bulbs being nearly coextensive with the outer dimensions of said cathode and said anodes.

4. A device as claimed in claim 3 wherein at least one of said bulbs is connected to a gas reservoir by a restricted conduit whereby damping of the modulated flow rate of gaseous flow in the discharge tube is prevented.

5. A device as claimed in claim 2 further including means for maintaining the gain of said ring-shaped laser at its maximum value.

6. A device as claimed in claim 5 wherein said means for maintaining the gain of said ring-shaped laser at its maximum value comprises: a semitransparent mirror arranged at one of the summits of the polygonal laser cavity, a photocell arranged behind said semitransparent mirror and receiving one of the two progressive waves of said laser and a connector which connects the output of said photocell to said modulator of said total input current whereby the amount of said total input current is varied to adjust the gain of said ring-shaped laser.

7. A device as claimed in claim 2 wherein said ring-shaped laser has two discharge tubes mounted within the laser cavity of said ring-shaped laser in opposite directions to propagated waves in opposite directions, each tube including one anode and one cathode arranged at the opposite ends of said tube and bulbs in gaseous communication with said discharge tube enclosing said cathodes and said anodes and wherein the inside dimensions of said bulbs being nearly coextensive with the outer dimensions of said cathodes and said anodes.

8. A device as claimed in claim 7 wherein at least one of said bulbs is connected to a gas reservoir by a conduit having a restriction whereby damping of the modulated flow rate of gaseous flow in the discharge tube is prevented.

* * * * *